(12) United States Patent
Obuchi et al.

(10) Patent No.: US 9,524,718 B2
(45) Date of Patent: Dec. 20, 2016

(54) SPEECH RECOGNITION SERVER INTEGRATION DEVICE THAT IS AN INTERMEDIATE MODULE TO RELAY BETWEEN A TERMINAL MODULE AND SPEECH RECOGNITION SERVER AND SPEECH RECOGNITION SERVER INTEGRATION METHOD

(71) Applicant: Clarion Co., Ltd., Chuo-ku, Saitama-shi, Saitama (JP)

(72) Inventors: Yasunari Obuchi, Tokyo (JP); Takeshi Homma, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/391,200

(22) PCT Filed: Apr. 3, 2013

(86) PCT No.: PCT/JP2013/060238
§ 371 (c)(1),
(2) Date: Oct. 8, 2014

(87) PCT Pub. No.: WO2013/154010
PCT Pub. Date: Oct. 17, 2013

(65) Prior Publication Data
US 2015/0088506 A1    Mar. 26, 2015

(30) Foreign Application Priority Data
Apr. 9, 2012    (JP) .................................. 2012-088230

(51) Int. Cl.
*G10L 15/30*    (2013.01)
*G10L 15/32*    (2013.01)
(Continued)

(52) U.S. Cl.
CPC ............... *G10L 15/30* (2013.01); *G10L 15/08* (2013.01); *G10L 15/32* (2013.01); *G10L 15/22* (2013.01)

(58) Field of Classification Search
None
See application file for complete search history.

(56) References Cited

U.S. PATENT DOCUMENTS 5,497,204 A    3/1996    Ko
5,794,204 A *  8/1998    Miyazawa ............ G10L 15/075
                                                704/244
(Continued)

FOREIGN PATENT DOCUMENTS

CN    1655235 A    8/2005
CN    1753083 A    3/2006
(Continued)

OTHER PUBLICATIONS

International Search Report (PCT/JP2013/060238) dated Jul. 16, 2013, with English translation( three (3) pages).
(Continued)

*Primary Examiner* — Qian Yang
(74) *Attorney, Agent, or Firm* — Crowell & Moring LLP

(57) ABSTRACT

The speech recognition result through the general-purpose server and that through the specialized speech recognition server are integrated in an optimum manner, thereby, a speech recognition function least in errors in the end being provided. The specialized speech recognition server 108 is constructed with the words contained in the user dictionary data in use as well as the performance of the general-purpose speech recognition server 106 is preliminarily evaluated with such user dictionary data. Based on such evaluation result, information related to which recognition results through the specialized and general-purpose speech recognition servers are adopted and to how the adopted recogni-
(Continued)

tion results are weighted to obtain an optimum recognition result is preliminarily retained in the form of a database. Upon executing recognition, an optimum recognition result is obtained by comparing the recognition results through the specialized and general-purpose servers with the parameter for recognition result integration 118.

10 Claims, 17 Drawing Sheets

(51) Int. Cl.
*G10L 15/08* (2006.01)
*G10L 15/22* (2006.01)

(56) References Cited

U.S. PATENT DOCUMENTS

| | | |
|---|---|---|
| 6,076,054 A | 6/2000 | Vysotsky et al. |
| 2002/0055845 A1 | 5/2002 | Ueda et al. |
| 2005/0180547 A1 | 8/2005 | Pascovici |
| 2007/0027693 A1 | 2/2007 | Hanazawa |
| 2010/0324899 A1 | 12/2010 | Yamabana |
| 2012/0330651 A1 | 12/2012 | Obuchi et al. |

FOREIGN PATENT DOCUMENTS

| | | |
|---|---|---|
| CN | 1905007 A | 1/2007 |
| CN | 101923854 A | 12/2010 |
| JP | 2002-116796 A | 4/2002 |
| JP | 2006-243673 A | 9/2006 |
| JP | 2008-242067 A | 10/2008 |
| JP | 2010-85536 A | 4/2010 |
| JP | 2010-224301 A | 10/2010 |
| JP | 2013-7764 A | 1/2013 |
| WO | WO 2011/121978 A1 | 10/2011 |

OTHER PUBLICATIONS

Chinese Office Action issued in counterpart Chinese Application No. 201380018950.0 dated Mar. 4, 2016 with English-language translation (ten (10) pages).

Supplementary European Search Report issued in counterpart European Application No. 13775442.0 dated Dec. 15, 2015 (11 pages).

* cited by examiner

FIG.3

| WORDS | GENERAL-PURPOSE SERVER |
|---|---|
| TARO HITACHI | × |
| HANAKO HITACHI | × |
| ICHIRO SUZUKI | ○ |
| JIRO YAMADA | ○ |
| SABURO SATO | × |

FIG.4

| WORDS | GENERAL-PURPOSE SERVER 1 | GENERAL-PURPOSE SERVER 2 | GENERAL-PURPOSE SERVER 3 |
|---|---|---|---|
| TARO HITACHI | × | × | × |
| HANAKO HITACHI | × | × | × |
| ICHIRO SUZUKI | ○ | ○ | ○ |
| JIRO YAMADA | ○ | × | × |
| SABURO SATO | × | × | ○ |

F I G . 6

| WORDS | GENERAL-PURPOSE SERVER 1 | GENERAL-PURPOSE SERVER 2 | GENERAL-PURPOSE SERVER 3 |
|---|---|---|---|
| TARO HITACHI | × | × | × |
| HANAKO HITACHI | × | × | × |
| ICHIRO SUZUKI | 3.0 | 1.4 | 1.2 |
| JIRO YAMADA | 2.5 | × | × |
| SABURO SATO | × | × | 1.3 |

FIG.7

| WORDS | GENERAL-PURPOSE SERVER 1 | GENERAL-PURPOSE SERVER 2 | GENERAL-PURPOSE SERVER 3 |
|---|---|---|---|
| TARO HITACHI | HITACHI CITY 3.0 | HITACHI 1.2 | (NO RESULT) 1.1 |
| HANAKO HITACHI | HITACHI DAINI HIGH SCHOOL 2.8 | HITACHI 0.9 | (NO RESULT) 1.0 |
| ICHIRO SUZUKI | 3.0 | 1.4 | 1.2 |
| JIRO YAMADA | 2.5 | YAMADA 0.8 | (NO RESULT) 1.0 |
| SABURO SATO | JIRO SATO 2.2 | SATO 0.9 | 1.3 |

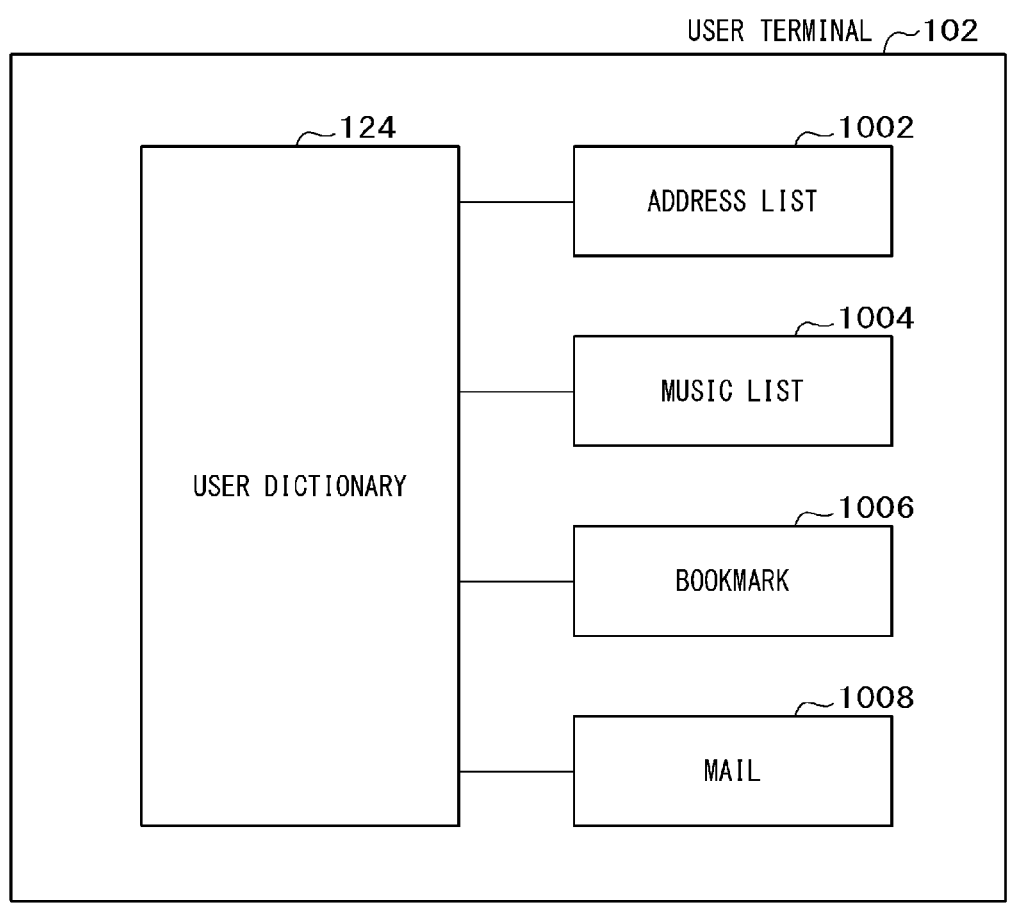

F I G . 1 2

| WORDS | GENERAL-PURPOSE SERVER 1 | GENERAL-PURPOSE SERVER 2 | SPECIALIZED SERVER |
|---|---|---|---|
| TARO HITACHI | × | × | 0.2 SECONDS |
| HANAKO HITACHI | × | × | 0.1 SECONDS |
| ICHIRO SUZUKI | 1.5 SECONDS | 0.5 SECONDS | 0.1 SECONDS |
| JIRO YAMADA | 1.8 SECONDS | × | 0.2 SECONDS |
| SABURO SATO | × | × | 0.2 SECONDS |

SPEECH RECOGNITION SERVER INTEGRATION DEVICE THAT IS AN INTERMEDIATE MODULE TO RELAY BETWEEN A TERMINAL MODULE AND SPEECH RECOGNITION SERVER AND SPEECH RECOGNITION SERVER INTEGRATION METHOD

TECHNICAL FIELD

The present invention relates to a device for connecting a terminal by which a user performs operations by use of speech to a plurality of speech recognition servers to recognize speech data and to return a recognition result to integrate the recognition results obtained by the plurality of speech recognition servers so as to provide a user with an optimum speech recognition result and the same method.

BACKGROUND ART

Such speech recognition functions as the operations of an in-vehicle informational equipment, handy phones and the like being performed through a user's voice are incorporated in a number of devices. Further, in recent years, thanks to the development of data communication technique, such system is going to prevail over the market as sending speech data to a server and performing further high-precision speech recognition by use of the computing resources of the server. As well, as disclosed in Patent Literature 1, in order to effectively use such speech recognition server, such system is proposed as placing an intermediate server between a personal terminal and a speech recognition server, through which additional processing is performed.

CITATION LIST

Patent Literature

Patent Literature 1: Japanese Unexamined Patent Application Publication No. 2008-242067
Patent Literature 2: Japanese Unexamined Patent Application Publication No. 2002-116796
Patent Literature 3: Japanese Unexamined Patent Application Publication No. 2010-224301

SUMMARY OF INVENTION

Technical Problem

Such cases are on the increase as a speech recognition server is operated as a general-purpose service, in which it often happens that an entity which provides services directed for a user's terminal and an entity which operates a speech recognition server are different. Further, even in case where the operating entity is single, there are some cases where the development of a speech recognition server and that of a speech recognition application are separately carried out and such developments are not mutually optimized to each other. In this situation, there are some cases where a general-purpose speech recognition server shows high performance in general, but it does not necessarily show sufficiently higher performance to respond to specific words.

On the other hand, when attention is paid to specific users who use a specific application, there exist such words of no general significance but of high importance to him/her as the names of his/her acquaintances and the titles of his/her favorite music songs. In order to recognize such words, it is preferable that a specialized speech recognition server be provided, but there are a lot of cases where ample cost is not incurred for the development of such specialized speech recognition server, so that such specialized server results in being inferior to a general-purpose speech recognition server regarding the performance to respond to general words. In this way, the recognition performance of some words differs between a general-purpose speech recognition server and a specialized speech recognition server or a there is difference in speech recognition performance between a general-purpose speech recognition server and a specialized speech recognition server. Accordingly, it is required that such servers be selectively used according to words which a user speaks, but considering that speech recognition is a task 'to estimate the content of the speech popped up from a user's mouth', in principle, it is impossible to selectively use such servers with the speech content recognized in advance.

The present invention is to provide a speech recognition function least in errors in the end by integrating the speech recognition result of a general-purpose speech recognition server and that of a specialized speech recognition server in an optimum manner.

Solution to Problem

According to the present invention, a list of specific words contained in a user's terminal is preliminarily obtained and a specialized speech recognition server is constructed based on the data of such words. Further, with such data in use, the performance of a general-purpose speech recognition server is evaluated in advance. Based on such evaluation result, among recognitions results obtained from specialized and general-purpose speech recognition servers, which results are adopted and how such results are weighted so as to obtain optimum recognition results are retained in the form of database. Upon a user actually using a speech recognition function, after his/her input speech is recognized by specialized and general-purpose speech recognition servers, the recognition results are compared with the content of the afore-mentioned database, thereby, allowing an optimum speech recognition result to be obtained. Moreover, as the criteria of such preliminary evaluation, a speech recognition result as correct as possible is obtained as soon as possible with a response speed in addition to the accuracy of speech recognition in use.

Exemplifying one example of a speech recognition server integration device according to the present invention, the device, which is an intermediate module to relay between a terminal module by which a user performs operations by way of speech and a speech recognition server to recognize speech data and to feed back its recognition result, comprises an integration-manner learning module to learn and preserve a parameter for recognition result integration based on words registered by the user or a list of words frequently used by the user; means to receive speech data spoken by the user for speech recognition from the terminal module; means to transmit the received speech data to a general-purpose speech recognition server and a specialized speech recognition server; means to receive recognition results of the speech data through the general-purpose speech recognition server and the specialized speech recognition server; a recognition result integration module to compare the recognition results through the general-purpose speech recognition server and the specialized speech recognition server with the preserved parameter for recognition result integration and to select an optimum recognition result; and means to transmit the selected recognition result to the terminal module.

The speech recognition server integration device according to the present invention may well be arranged such that it further comprises means to receive the words registered by the user or the list of words frequently used by the user from the terminal module; a module of making synthesized speech based on the received words; means to transmit the made synthesized speech to the general-purpose speech recognition server and the specialized speech recognition server; and means to receive the recognition results of the synthesized speech through the general-purpose speech recognition server and the specialized speech recognition server and the integration-manner learning module concurrently analyses the words from which the synthesized speech derives and the recognition results so as to learn and preserve the parameter for recognition result integration.

Further, the speech recognition server integration device according to the present invention may well be arranged such that it further comprises means to receive the words registered by the user or the list of words frequently used by the user from the terminal module; means to receive a list of words for recognition from the general-purpose speech recognition server; and a words comparison/similarity estimation module to compare the list of words for recognition with the list of words received from the terminal module and to estimate similarity between the lists and the integration-manner learning module preserves an estimation result as the parameter for recognition result integration.

Exemplifying one example of a speech recognition server integration method according to the present invention, it comprises a step of learning and preserving a parameter for recognition result integration based on words registered by a user or a list of words frequently used by the user; a step to transmit data of a speech spoken by the user for speech recognition to a general-purpose speech recognition server and a specialized speech recognition server; means to receive recognition results of the speech data through the general-purpose speech recognition server and the specialized speech recognition server; and a step to compare the recognition result of the general-purpose speech recognition server and the recognition result of the specialized speech recognition server with the parameter for recognition result integration so as to select an optimum speech recognition result.

Advantageous Effects of Invention

According to the present invention, as for the general words, importance is placed on the recognition result of the general-purpose speech recognition server while as for the words specific to a user, importance is placed on the recognition result of the specialized speech recognition server, so that the integration of the recognition results for the respective input speeches is carried out in an optimum manner, with the result that it allows a speech recognition function least in errors in the end to be provided to a user. Further, the system not only least in errors, but also highly advantageous in the aspect of response speed is realized.

BRIEF DESCRIPTION OF DRAWINGS

FIG. 3 is a view showing one example of a parameter for recognition result integration with a single general-purpose speech recognition server in use according to the present invention.

FIG. 4 is a view showing one example of a parameter for recognition result integration with plural general-purpose speech recognition servers in use according to the present invention.

FIG. 6 is a view showing one example of a parameter for recognition result integration with the confidence measure of the plural general-purpose speech recognition servers in use according to the present invention.

FIG. 7 is a view showing one example of a parameter for recognition result integration with the confidence measure and misrecognition results of the plural general-purpose speech recognition servers in use according to the present invention.

FIG. 10 is a view showing one example of how to make a user dictionary according to the present invention.

FIG. 12 is a view showing one example of a parameter for recognition result integration with response speed taken into account according to the present invention.

DESCRIPTION OF EMBODIMENTS

Figure 1:
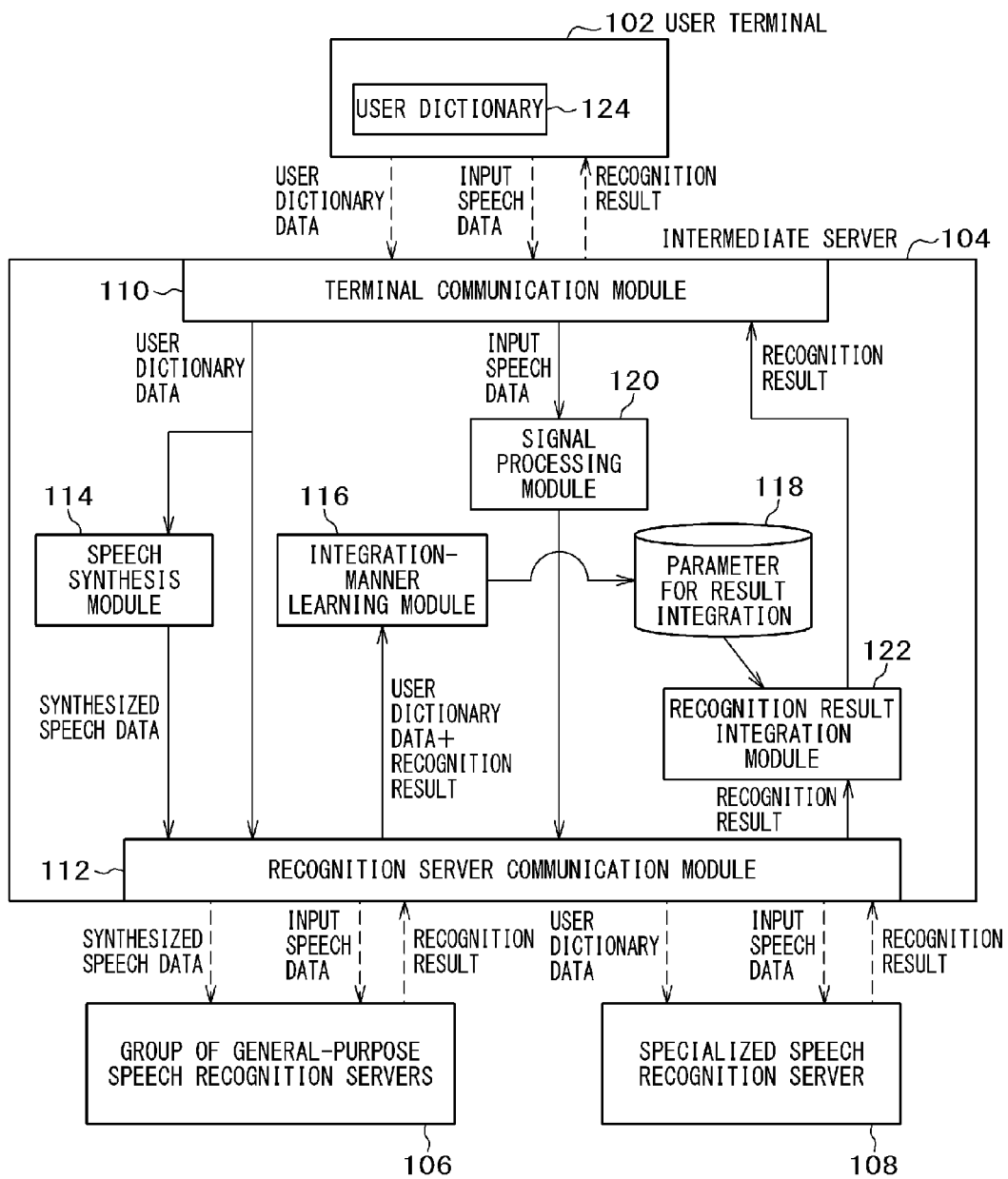
FIG. 1 illustrates the structural view of a speech recognition server according to Example 1 of the present invention.

Hereafter, the examples according to the present invention are explained with reference to the accompanying drawings. To note, in the whole illustrations to explain the embodiments to carry out the invention, the same appellations and reference numerals are used for the elements having the same function, to avoid redundancy.

Example 1

FIG. 1 is a view illustrating the structural example of a speech recognition server integration device according to the present example, in which a speech recognition function is provided with a user terminal 102, an intermediate server 104, a group of general-purpose speech recognition servers 106, a specialized speech recognition server 108 in use. To note, a group of general-purpose speech recognition servers 106 may well be replaced with a single general-purpose speech recognition server.

The user terminal 102 is a terminal that a user has at hand and retains such list of words specific to such user as address list and a list of music songs besides obtaining input speech data and providing services based on the speech recognition result. Hereinafter, such list of words specific to a user is referred to as 'user dictionary'. In this user dictionary, the words registered by the user and the list of words frequently used by the user are retained.

A group of general-purpose speech recognition servers 106 consist of more than one speech recognition servers which are not supposed to be exclusively used for the services realized by the present invention. In general, they incorporate a large-scale list of words and are excellent in recognition accuracy for various words whereas there is likelihood that apart of words contained in the user dictionary might not be correctly recognized.

The specialized speech recognition server 108 is a speech recognition server dedicated for the services realized by the present invention and is designed such that it recognizes the whole or most of the words contained the user dictionary. The specialized speech recognition server 108 is designed such that 'no recognition result' is outputted from it when a word not contained in the user dictionary is inputted in it. The specialized speech recognition server is not limited to what is arranged as a server, but may well be a specialized speech recognition device or be incorporated in a user terminal or an intermediate server as exemplified in Examples 2 and 5.

The intermediate server 104 corresponds to 'a speech recognition server integration device' according to the present invention and connects the user terminal 102 to the speech recognition servers 106 and 108 so as to perform the integration of the speech recognition results and so forth. Exchanging data with the user terminal 102 is carried out through a terminal communication module 110. Further, exchanging data with the speech recognition servers 106 and 108 is carried out through a recognition server communication module 112. The intermediate server 104 consists of the terminal communication module 110, a speech synthesis module 114, an integration-manner learning module 116, a signal processing module 120, a recognition result integration module 122, the recognition server communication module 112 and as such.

The operation of the intermediate server 104 is explained. In the first place, upon a user setting the user terminal 102 such that it is capable of communication, data contained in the user dictionary 124 is transmitted through the terminal communication module 110. Such data is sent directly to the recognition server communication module 112 and then sent to the specialized speech recognition server 108. On the part of the specialized speech recognition server 108, based on the transmitted user dictionary data, tuning is performed such that the words contained in such data is rendered correctly recognizable. On the other hand, the user dictionary data received at the terminal communication module 110 are also sent to the speech synthesis module 114. At the speech synthesis module, based on the user dictionary data transmitted in the form of a series of characters, synthesized speech data is made. The synthesized speech data for one word may well be one kind or several kinds having different sounds. The prepared synthesized speech data is sent through the recognition server communication module 112 to a group of general-purpose speech recognition servers 106 and the specialized speech recognition server 108. Upon the recognition result for such synthesized speech data being returned from the respective servers, the recognition server communication module 112 receives the recognition results and sends them to the integration-manner learning module 116. On the part of the integration-manner learning module 116, the user dictionary data from which the synthesized speech data derives and the recognition results are concurrently analyzed and a parameter for recognition result integration is learnt. The acquired parameter is preserved as a parameter for recognition result integration 118. At this time, the preliminary learning step of the system according to the present invention ends.

Upon a user actually using a speech interface, the input speech data obtained at the user terminal 102 is received by the terminal communication module 110. The received data is sent to the signal processing module 120 and subjected there to processing as required. Hereupon, 'processing as required' indicates removing noise from the input speech mixed with noise by way one example, but such processing is not necessarily essential to perform. Any processing may well be not performed. The data outputted from the signal processing module 120 is sent through the recognition server communication module 112 to a group of general-purpose speech recognition servers 106 and the specialized speech recognition server 108. The recognition results fed back from those servers are sent through the recognition server communication module 112 to the recognition result integration module 122. On the part of the recognition result integration module 122, a plurality of recognition results are compared with the parameter contained in the parameter for recognition result integration 118, so that an optimum recognition result is selected. The selected recognition result is sent through the terminal communication module 110 to the user terminal 102. On the part of the user terminal 102, based on such optimum recognition result, such services are provided as setting a destination of the navigation function, making a call, reproducing a music song and as such.

Figure 2:
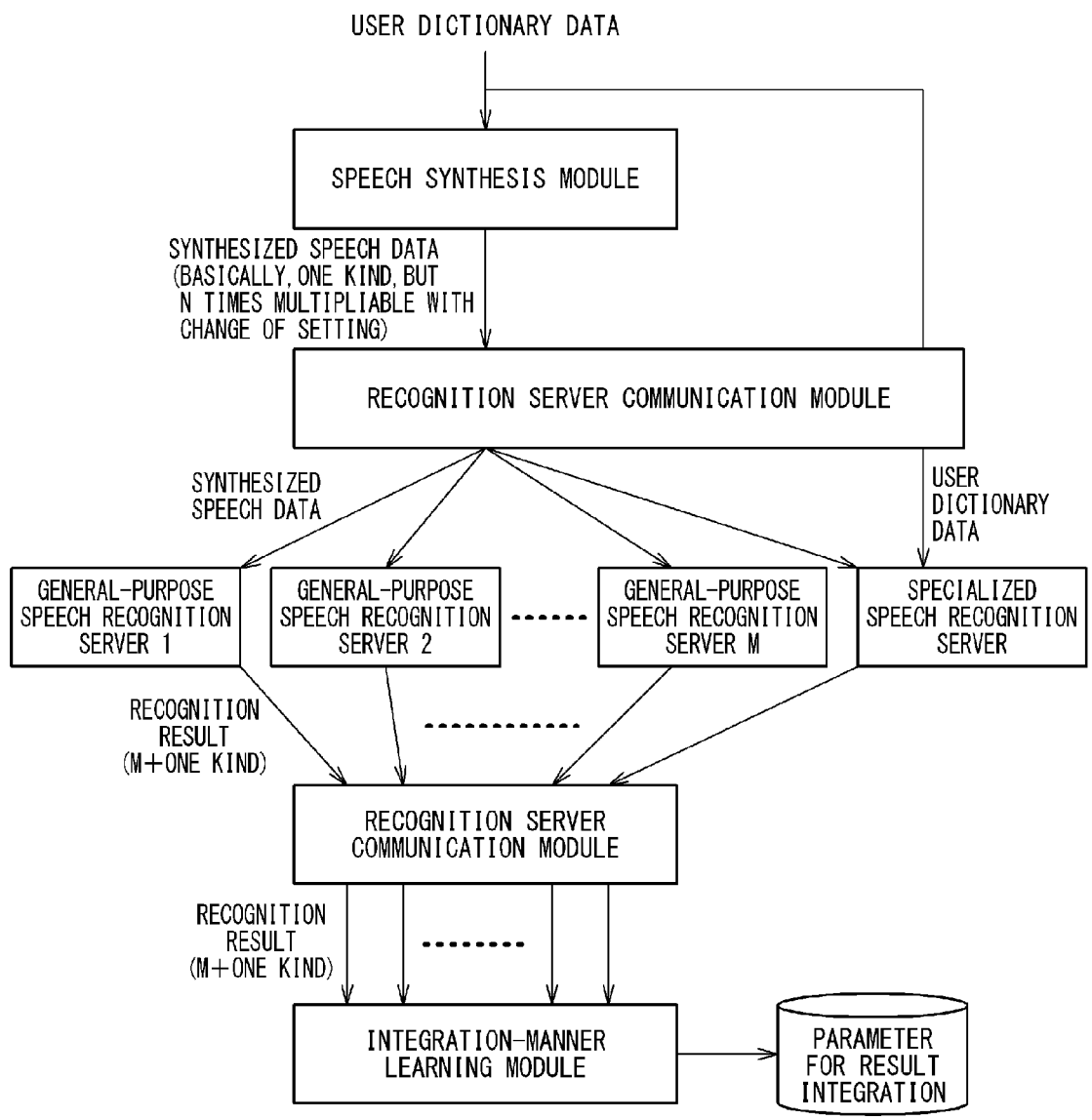
FIG. 2 is a view showing the step of estimating a parameter for recognition result integration with speech synthesis in use according to Example 1 of the present invention.

FIG. 2 is a view showing the steps of up to making a parameter for recognition result integration with the user dictionary data in use in the arrangement as shown in FIG. 1. To begin with, the user dictionary data is sent to the specialized speech recognition server as it is. On the part of the specialized speech recognition server, its speech recognition engine is tuned up such that the transmitted words are rendered into recognition objects. Accordingly, when data of a word spoken but not contained in the user dictionary is sent to the specialized speech recognition server, it results in feeding back a wrong result or a non-recognizable result. On the other hand, the user dictionary data is also sent to the speech synthesis module, synthesized speech data is made there. Normally, one synthesized speech is made for one word, but when the speech synthesis module has a function enabling a speaker, a speaking tempo, a voice pitch and as such to be selected, making a plurality of synthesized speech data for the same word with such speaker, speaking tempo, voice pitch varied leads to further enhancing the performance of the integration-manner learning as noted in the following paragraph.

The prepared synthesized speech data is sent to the respective general-purpose speech recognition servers and the specialized speech recognition server. From those servers, the recognition results are fed back. Further, there are cases where not only such result, but also the accompanying confidence scores might be concurrently fed back. Based on such results and confidence scores, the integration-manner is learnt at the integration-manner learning module, which result is preserved in a parameter for recognition result integration.

FIG. 3 is a view showing an example of the simplest arrangement of a parameter for recognition result integration. According to this example, it is assumed that there is only one general-purpose speech recognition server and whether or not the respective words contained in the user dictionary are correctly recognized with a circle for Yes and an X for No is retained in the server. Namely, FIG. 3 shows that the words 'Ichiro SUZUKI' and 'Jiro YAMADA' are correctly recognized by the general-purpose speech recognition server, but the other words are not correctly recognized. FIG. 4 shows an example in which the similar learning as shown in FIG. 3 is carried out with three general-purpose speech recognition servers in use.

Figure 5:
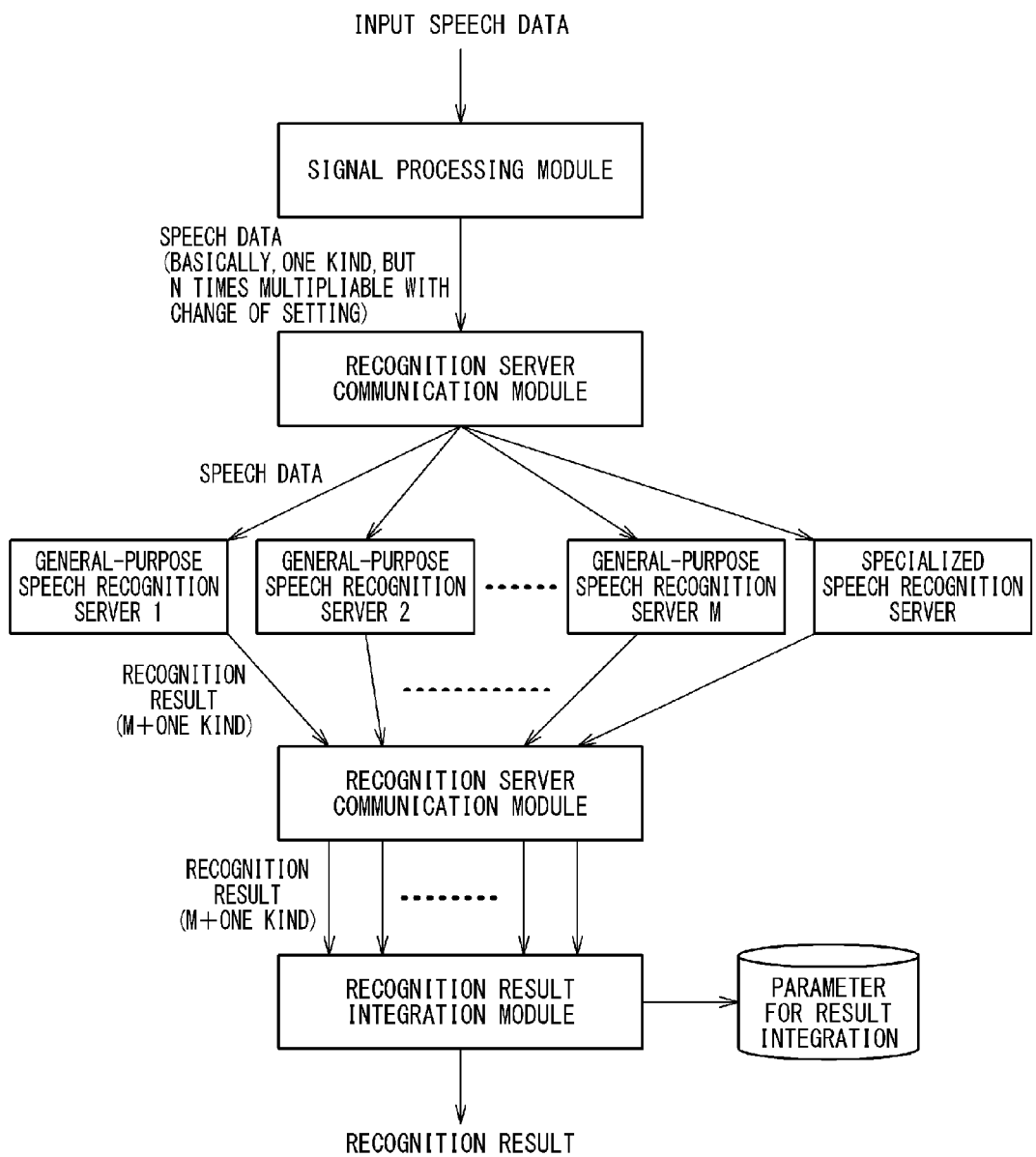
FIG. 5 is a view showing one example of how to integrate the recognition results of the plural servers according to Example 1 of the present invention.

The steps of actually recognizing speech with the results shown in FIGS. 3 and 4 in use are shown in FIG. 5. The input speech data is firstly subjected to preliminary processing at the signal processing module. As one of the representative steps performed at the signal processing module, a noise suppression process is exemplified as disclosed in Patent Literature 1. As the result of the preliminary processing at the signal processing module, it is normal that one speech data for one input speech data is obtained, but there are some cases where a plurality of speech data might be obtained. In such cases, the following operational steps are repeated by the number of speech data. Further, in case where it is determined that any step is not required at the signal processing module, the input speech data as it is rendered into the output data of the signal processing module.

The output data of the signal processing module is sent to the general-purpose speech recognition server and the specialized speech recognition server. All the recognition results are sent to the recognition result integration module. On the part of the recognition result integration module, the recognition result of the specialized speech recognition server is firstly checked. When the recognition result of the specialized speech recognition server results in 'no recognition result', the definitive recognition result is determined only from the recognition result of the general-purpose speech recognition server. That is to say, when there is only one general-purpose speech recognition server, its recognition result is adopted as it is. When there are several general-purpose speech recognition servers, the majority vote is taken among those recognition results. Upon taking the majority vote, just when the respective general-purpose speech recognition servers provide a confidence score accompanied with their recognition results, the majority vote may well be weighted with such score. Further, preliminarily estimating the performance of the respective general-purpose speech recognition servers brings a coefficient used when the majority vote is weighted with such score. As for such integration of the recognition results for general words through a plurality of speech recognition servers, such well-known technique as disclosed in Patent Literature 2 is adoptable.

On the other hand, when words contained in the user dictionary data are obtained as the result of the recognition result through the specialized speech recognition server, the parameter for recognition result integration as shown in FIGS. 3 and 4 is referred to. By way of one example, with reference to the example as shown in FIG. 3, when the recognition result of the specialized speech recognition sever is 'Taro HITACHI', looking at the corresponding line of the parameter for recognition result integration, it is known that such word is not recognizable with the genera-purpose speech recognition server, so that the recognition result of the specialized speech recognition server is adopted as it is. Now, when the recognition result of the specialized speech recognition server is 'Ichiro SUZUKI', looking at the corresponding line of the parameter for recognition result integration, it is known that this word is recognizable also with the specialized speech recognition server. Then, the recognition result of the general-purpose speech recognition server is checked. When the recognition result of the general-purpose speech recognition server is also 'Ichiro SUZUKI', 'Ichiro SUZUKI' as it is may well be defined as the definitive recognition result whereas otherwise the recognition result of the general-purpose speech recognition server is prioritized or the recognition result having a higher confidence score among those of the general-purpose speech recognition server and the specialized speech recognition server is adopted as the definitive recognition result. This allows a word similar in sound to 'Ichiro SUZUKI' misrecognized by the specialized speech recognition server to be rescinded based on the recognition result of the general-purpose speech recognition server. The same arrangement as above applies to the example shown in FIG. 4. Namely, as with 'Taro HITACHI', the recognition result through the specialized speech recognition server is unconditionally adopted. As for 'Ichiro SUZUKI', it is a word recognizable to each of three general-purpose speech recognition servers, so that the definitive recognition result is determined through the majority vote among the recognition results through those genera-purpose servers or through the majority vote the specialized speech recognition server in addition to among those general-purpose servers. Further, when the recognition result through the specialized speech recognition server is 'Jiro YAMADA', because it is only the general-purpose speech recognition server 1 that can correctly recognize this word, the definitive recognition result is obtained by performing the same operational steps as exemplified and shown in FIG. 3 between the general-purpose server 1 and the specialized speech recognition server.

FIG. 6 shows another example of realizing a parameter for recognition result integration different from those shown in FIGS. 3 and 4. Hereat, where a certain word is recognizable with the respective general-purpose speech recognition servers, the probability of such word being correctly recognized by each of the servers is replaced with a value of weight for retention. Hereupon, such probability may be estimated by each server recognizing the word 'Ichiro SUZUKI', by way of one example, through synthesized speeches prepared with a parameter for speech synthesis varied and determining how many recognition results for such synthesized speeches are correct. Further, where the general-purpose speech recognition server is arranged such that it feeds back several recognition result candidates, an average of the rank order and an average of the confidence score of each server based on the number of correct recognition results for such word may be exploited. What such averages are converted into values of weight through non-linear transformation is retained in a parameter for recognition result integration. In the present example, when the recognition result through the specialized speech recognition server is 'Ichiro SUZUKI' and that through the general-purpose server 1 is 'Ichiro SASAKI' and those through the general-purpose servers 3 and 4 correspond to 'Ichiro SUZUKI', the weight of 'Ichiro SASAKI' results in 3.0 while that of 'Ichiro SUZUKI' results in 2.6 resulting from the sum of 1.4 and 1.2, so that the former is larger than the latter, with the result that the word 'Ichiro SASAKI' turns out to be the definitive recognition result.

FIG. 7 shows another example of realizing a parameter for recognition result integration different from those shown in FIGS. 3, 4 and 6. Hereat, where a word contained in the user dictionary data is recognized through the general-purpose speech recognition server and even when such word is not correctly recognized by the same, the gained recognition result is preserved as a parameter for recognition result integration. Setting the weight of each server is the same as exemplified in FIG. 6. When several recognition experiments are made, only the most frequent recognition result or a plurality of recognition results may well be preserved. Further, irrespectively of the number of recognition experiments, the recognition results positioned in the second rank or lower may well be concurrently preserved. Upon the execution of recognition, in the same way as the abovementioned examples, the parameter for recognition result integration is referred to based on the recognition result of the specialized speech recognition server. Hereupon, it is checked whether or not the recognition result through each of the general-purpose speech recognition servers corresponds to what is preserved in the parameter for recognition result integration. By way of one example, where the recognition result through the specialized speech recognition server is 'Taro HITACHI' while that through the general-purpose server 1 is 'Hitachi City' and that through the general-purpose server 2 is 'Hatachi' as well as that through the general-purpose server 3 is 'Hitachi', in addition that the recognition result through the general-purpose server 1 is transformed into 'Taro HITACHI', the majority vote is taken for the respective recognition results, so that the word 'Taro HITACHI' is selectively defined as the definitive recognition result.

Figure 8:
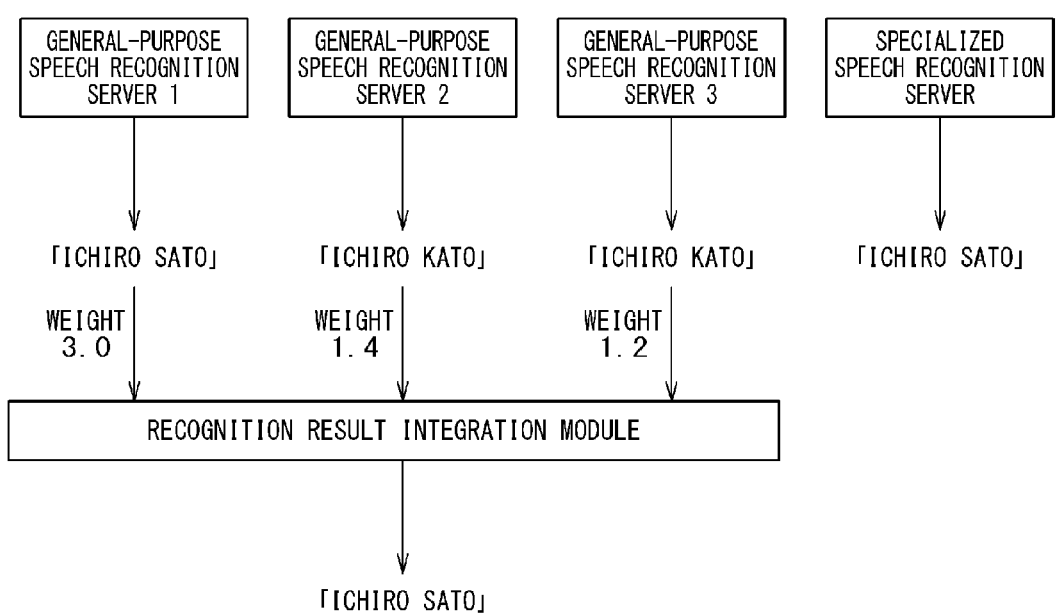
FIG. 8 is a view showing one example of how to integrate the recognition results with the conversion of homonyms in use according to the present invention.

FIG. 8 is a view showing an example of how to integrate speech recognition results with the detection of homonyms put to use. As shown in FIG. 8, where the recognition result through the specialized speech recognition server is 'Ichiro SATO' containing another Chinese character used for the part thereof or 'SA' different from its normal description, this word is compared with the respective recognition results of the general-purpose speech recognition servers for checking whether or not any homonym is contained in such results. Hereupon, in order to estimate the pronunciation of a word through its characters, in the case of Japanese language, its phonetic description may be obtained by retaining how to pronounce individual Chinese characters in the form of data and interconnecting how to pronounce the respective Chinese characters comprising the word. In the case of English language, the phonetic rules for segmental spellings are retained and the phonetic description of a word is obtained by subsequently applying such rules. Also in the case of the other languages, it is known that a phonetic description of a word can be obtained through the technique generally referred to as 'Grapheme to Phoneme'. Moreover, there are some cases where phonetic information such as a phonetically pronounced 'Kana' description corresponding to a Chinese character might be contained in the user dictionary data, in which case such information is utilized. As the result of the above checking, when homonyms are contained in any of the recognition results, the description by such results is conversed into that by the recognition result through the specialized speech recognition server for use. In the example shown in FIG. 8, the word 'Ichiro SATO' containing a different Chinese character used for the part thereof or 'SA' from the counterpart recognized by the specialized speech recognition server and corresponding to the recognition result through the general-purpose speech recognition server 1 has the same homophone as the recognition result by the specialized speech recognition server, so that the word 'Ichiro SATO' recognized by the general-purpose server 1 is transformed into 'Ichiro SATO' containing another Chinese character used for the part thereof or 'SA' different from its normal description. As the result of it, the result of the majority vote among three general-purpose speech recognition servers is 'Ichiro SATO' containing another Chinese character used for the part thereof or 'SA' different from its normal description, which is adopted as the definitive recognition result.

Figure 9A:
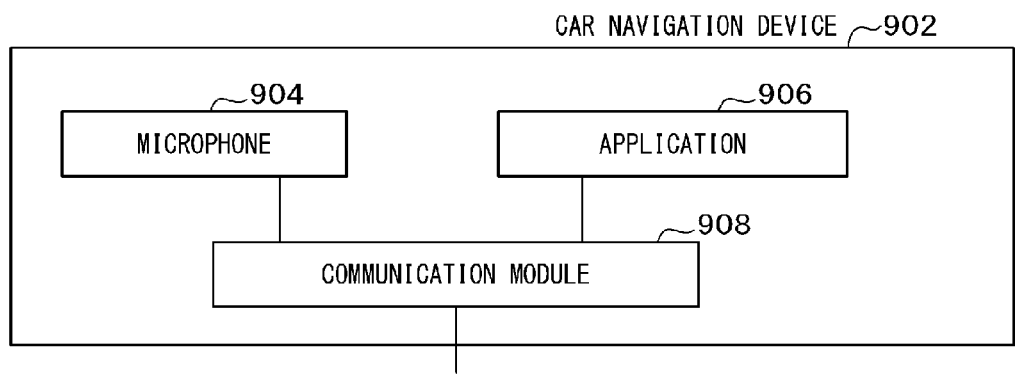
FIG. 9A shows concrete examples of the user terminal to realize the present invention.
Figure 9B:
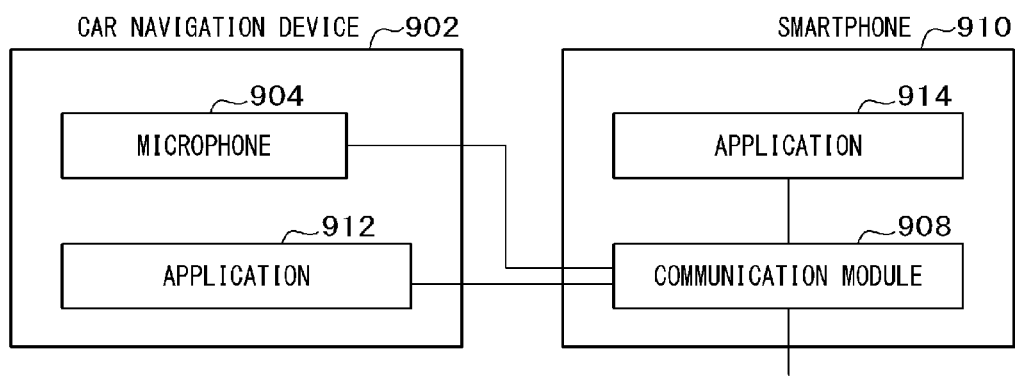
FIG. 9B shows other concrete examples of the user terminal to realize the present invention.
Figure 9C:
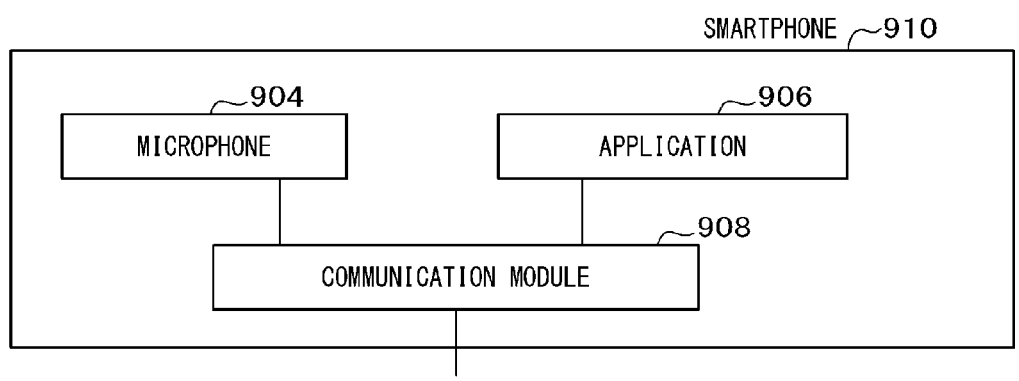
FIG. 9C shows other concrete examples of the user terminal to realize the present invention.

FIG. 9A to 9C shows concrete examples of the user terminal, in which it provides an in-vehicle navigation function and/or an in-vehicle hands-free call function. In FIG. 9A, the entire functions as a microphone 904, an application 906, a communication module 908 and as such are mounted in the car navigation device 902. In FIG. 9B, the car navigation device 902 is connected to a smartphone 910, in which the microphone 904 incorporated in the car navigation device 902 and the communication module 908 incorporated in the smartphone 910 are utilized. The applications 912 and 914 are disposed separately in the car navigation device and the smartphone according to their functions or are disposed in either one of them. In FIG. 9C, the entire functions as mentioned above are mounted in the smartphone 910.

FIG. 10 is a view showing an example of how to make the user dictionary 124 constituting the present invention. For instance, where there exists an address list 1002 within the user terminal 102, the personal names contained in such list are registered in the user dictionary 124. In the same way, there exists a list of music songs by professional players or singers 1004 therein, the titles of such songs, players and singers contained in such list are registered in the user dictionary 124. Further, the page titles registered as bookmarks 1006 of web browsers may well be registered in the user dictionary 124. Otherwise, data on mails 1008, short messages and as such accumulated in the user terminal is subjected to analysis and the words frequently appeared in them may be registered in the user dictionary. As with those data, upon the user terminal being connected to the system according to the present invention for the first time, in addition that the entire user dictionary data contained in the user terminal is transmitted to the system, when new entries are added to the address list and the list of music songs, only newly added data is additionally transmitted to the system so as to promote the renewal of a parameter for recognition result integration. At this time, it is required that not only the parameter for recognition result integration, but also the word dictionary of the specialized speech recognition module be simultaneously renewed.

Figure 11:
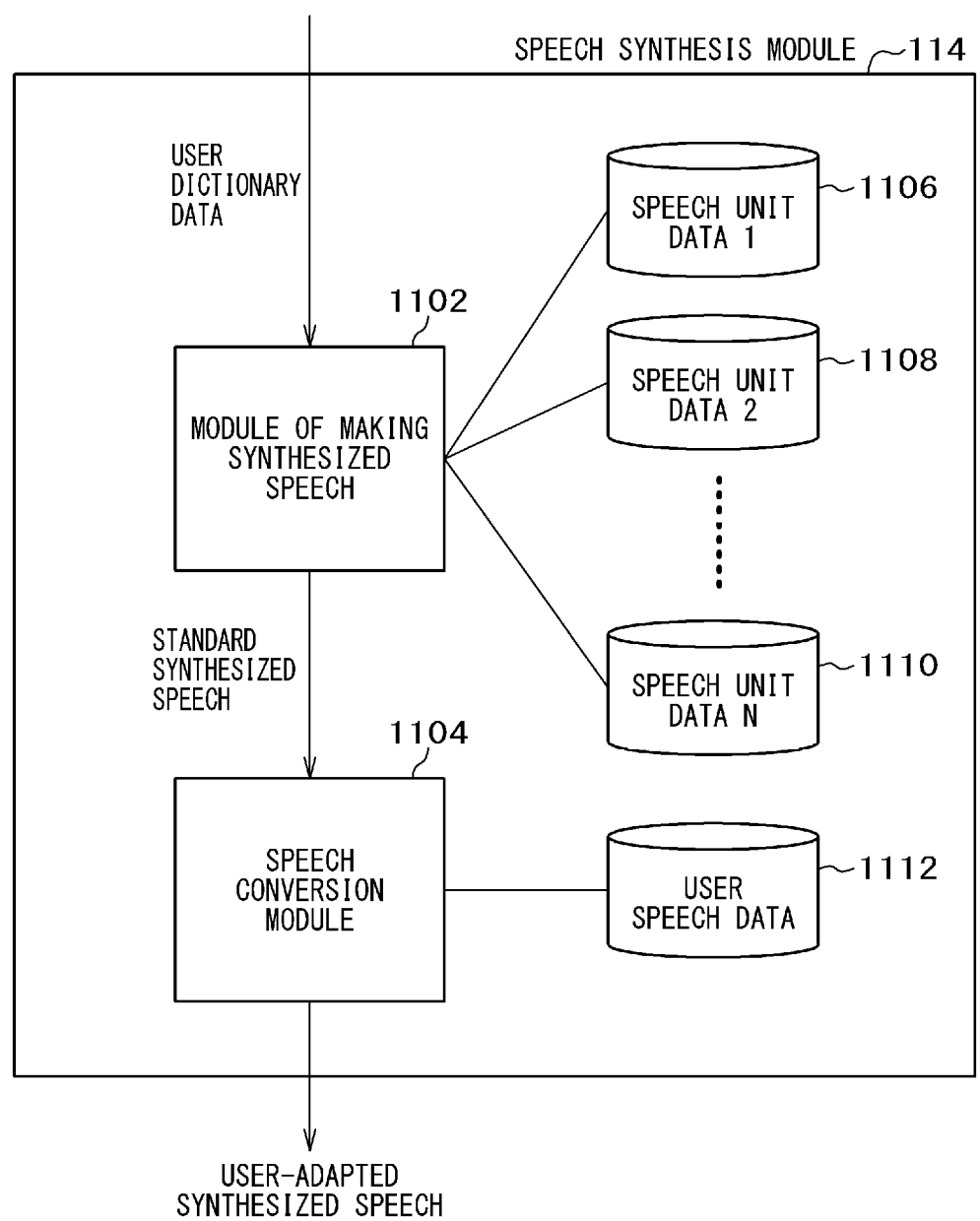
FIG. 11 is a view showing one structural example of the speech synthesis module according to the present invention.

FIG. 11 is a view showing one example of the particular arrangement of a speech synthesis module specialized for the present invention with the arrangement of the generally known counterpart altered. Generally speaking, the speech synthesis module 114 comprises a module of making synthesized speech 1102 and speech unit data 1106 to 1110. The unit data referred to herein is the denomination of the data to be used in the method by which data are directly interconnected with one another so as to make a synthesized speech, but even when the method by which the waveforms of data are synthesized through statistical processing and signal processing is adopted instead of data being directly interconnected with one another, the similar data set is used for the processing units such as individual phonemes and syllables, so that the following operational steps are applicable. On the part of the module of making synthesized speech 1102, speech unit data are interconnected with one another and the interconnected data are subjected to a proper signal processing so as to have a standard synthesized speech made. However, according to the present invention, on account that it is very important to know how a group of general-purpose speech recognition servers react to the voice of the specific user having the user terminal, it is preferred that the synthesized speech made by the speech synthesis module be similar to the voice of such specific user. Thus, every time when a user uses a speech recognition function or the other speech functions or voice calls, the very voice is accumulated as user's speech data 1112, utilizing which data a standard synthesized speech is converted into a user-adapted speech through a speech conversion module 1104. By the converted voice in such a manner as mentioned above being inputted into a group of general-purpose speech recognition servers, it allows them to perform an enhanced high-precision speech recognition, so that it is expected that the value of the parameter for recognition result integration is further optimized.

FIG. 12 is a view showing an example of a parameter for recognition result integration whose evaluation criteria include response speed in addition to the correctness of speech recognition. In this example, each server executes the recognition of each word contained in the user dictionary data with the synthesized speech corresponding to each word in use and the average time taken for such recognition is retained as a parameter. In this example, where the recognition result through the specialized speech recognition server is the word 'Ichiro SUZUKI', it is expected that the recognition result through the general-purpose server 2 is obtained with the response speed of 0.5 seconds whereas 1.5 seconds must lapse before the recognition result by the general-purpose server 1 is obtained. When such response time goes beyond the maximum value supposed by the application, recognition result integration processing is performed once the recognition result through the general-purpose server 2 is obtained. It allows the definitive recognition result to be obtained at the response time of approximately 0.5 seconds, assuming that it hardly takes any time to perform such recognition result integration processing, which leads to improving on user-friendliness.

Example 2

Figure 13:
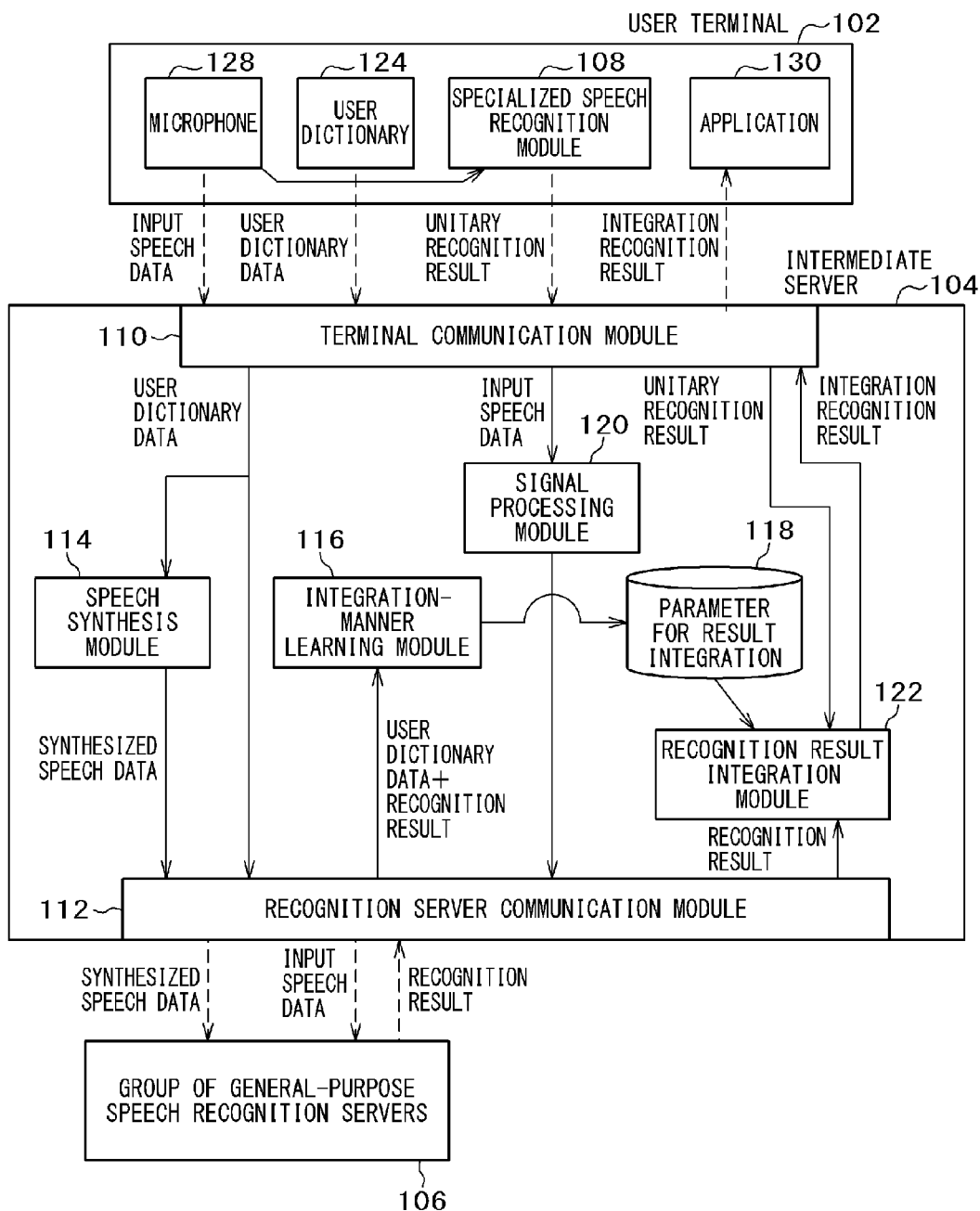
FIG. 13 illustrates the structural view of the speech recognition server integration device according to Example 2 of the present invention.

FIG. 13 is a view showing the arrangement of the speech recognition server integration device with a specialized speech recognition module 108 incorporated in the user terminal in use such that it realizes the equivalent functions as that exemplified in FIG. 1. Here, the user terminal 102 recognizes the words contained in the user dictionary 124 with in use the specialized speech recognition module 108 incorporated in itself and without the intervention of the intermediate server 104. The method by which the speech recognition through a group of general-purpose speech recognition servers 106 is preliminarily evaluated with the user dictionary data in use is the same as that shown in FIG. 1. Upon the execution of speech recognition, the speech recognition through the respective general-purpose speech recognition servers 106 is performed via the intermediate server 104 and at the same time the speech recognition through the specialized speech recognition module 108 incorporated in the user terminal is performed as well. Such method as mentioned above in which the speech recognition module incorporated in the terminal along with the speech recognition modules connected through a communication module are concurrently used is disclosed in Patent Literature 3, but there is difference between the prior invention disclosed in Patent Literature 3 and the present invention in that as for the prior invention disclosed in Patent Literature 3, the selection of recognition results is made with attention paid to whether or not communication path is established whereas according to the present invention a parameter for recognition result integration derived from the result of the preliminary speech recognition is put to use.

Example 3

Figure 14:
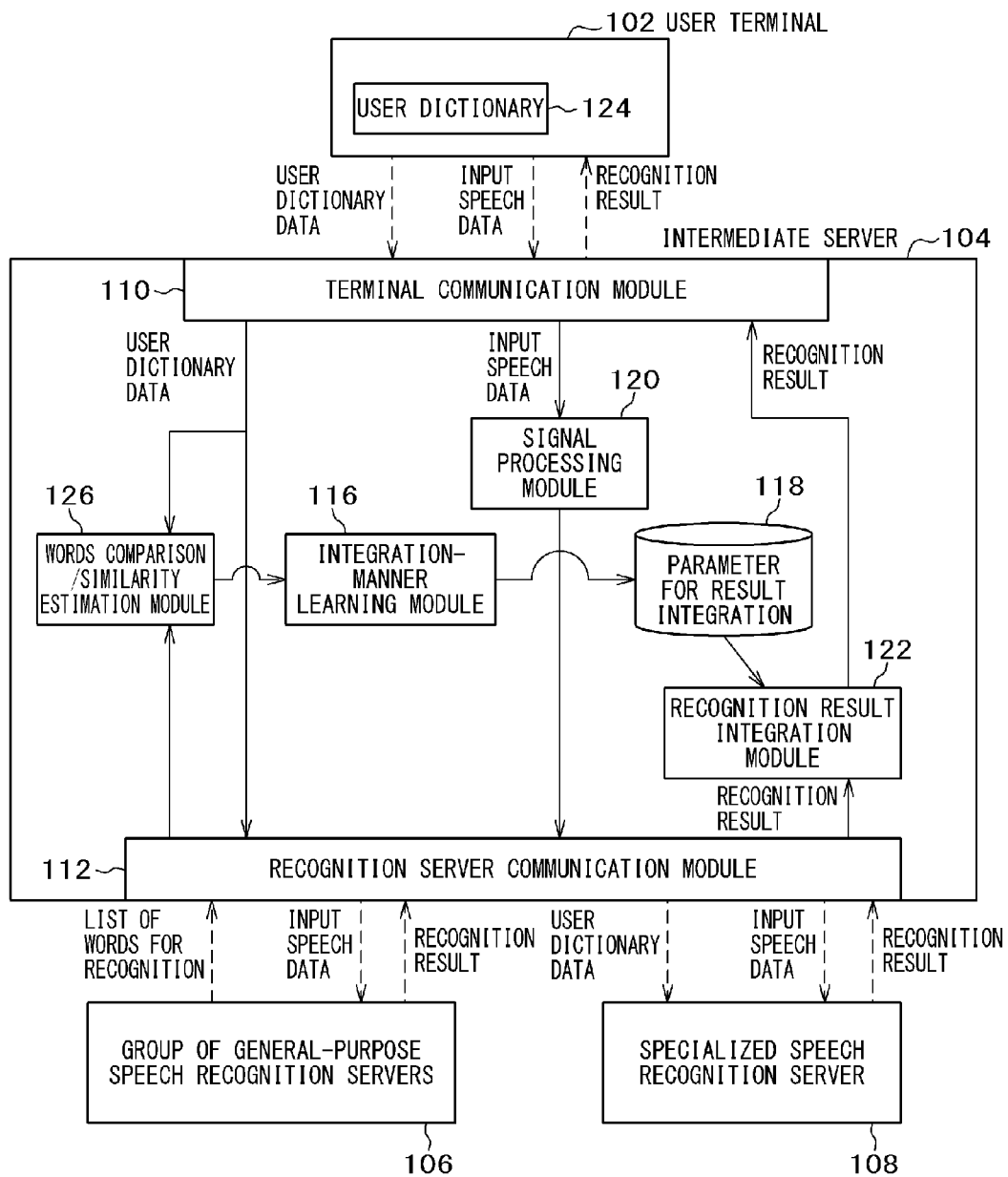
FIG. 14 illustrates the structural view of the speech recognition server integration device according to Example 3 of the present invention.

FIG. 14 is a view showing another arrangement of a speech recognition server integration device according to the present invention. It is assumed herein that the list of words for recognition used in a group of general-purpose speech recognition servers 106 is available as one of the functions of such group. Under such condition, the user dictionary data transmitted to the intermediate server 104 from the user terminal 102 is sent to a words comparison/similarity estimation module 126. On the part of the words comparison/similarity estimation module, the list of words for recognition acquired from the group of general-purpose speech recognition servers 106 is compared with the user dictionary data and whether or not the respective words contained in the user dictionary 124 is correctly recognized by each server is determined. The result of such determination is sent to an integration-manner learning module 116 and what is put in order as a parameter is retained in a parameter for recognition result integration 118. On the other hand, what the user dictionary data as it is sent to the specialized speech recognition server 108 and the server is tuned up is the same as exemplified in FIG. 1

In the state where such preparation is over, when the input speech data is sent from the user terminal 102, in the same way as exemplified in FIG. 1, the input speech data is sent through the signal processing module 120 to the general-purpose speech recognition servers 106 and the specialized speech recognition server 108. The recognition results fed back from those servers are sent to the recognition result integration module 122, where those recognition results are compared with the parameter for recognition result integration 118 so as to have an optimum recognition result selected. The subsequent steps after the selected recognition result is sent to the user terminal 102 are the same as exemplified in FIG. 1.

Figure 15:
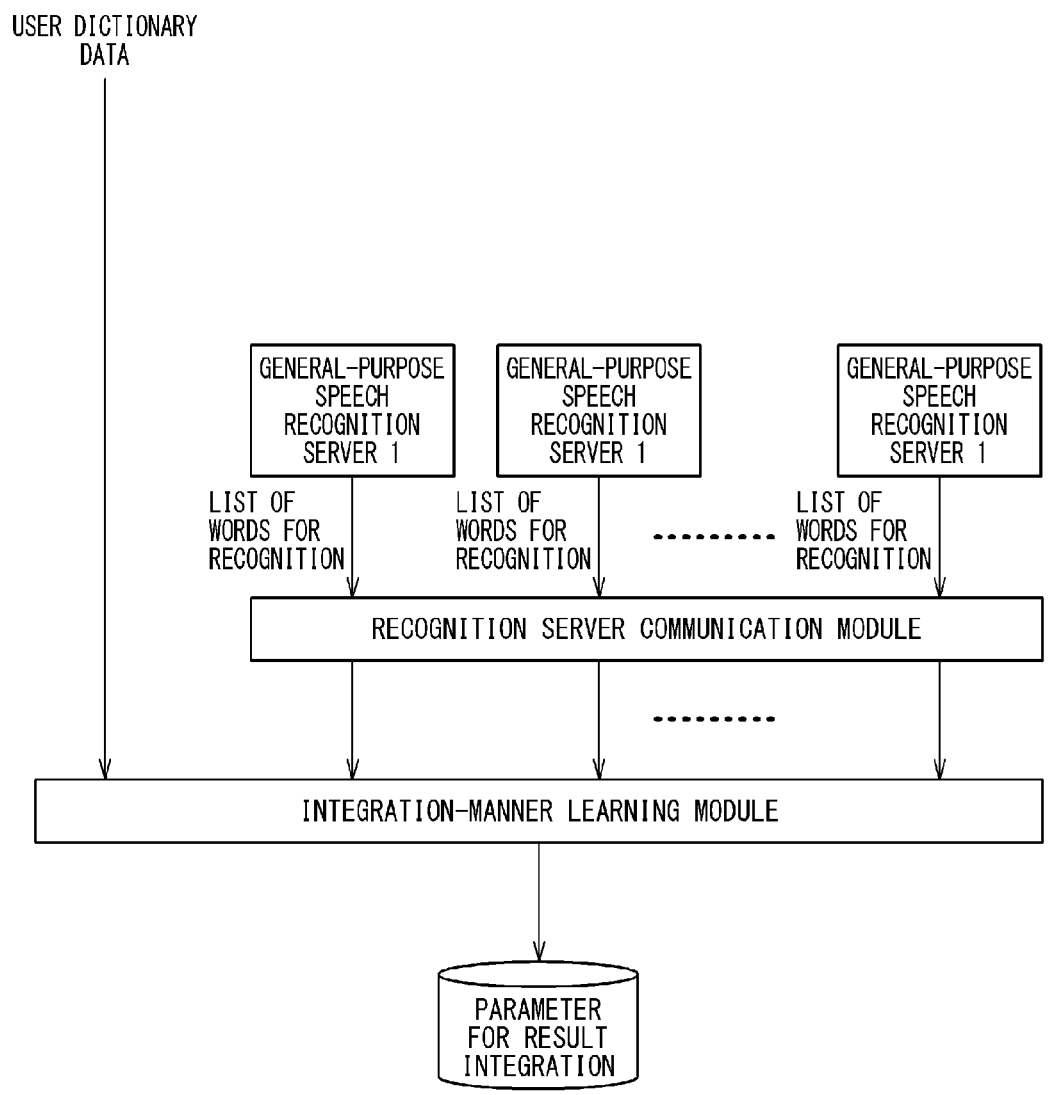
FIG. 15 is a view showing the step of estimating a parameter for recognition result integration with a list of words for recognition according to Example 3 of the present invention.

FIG. 15 is a view showing the operational steps of up to making a parameter for recognition result integration with the user dictionary data in use in the arrangement exemplified in FIG. 14. In this example, the lists of words for recognition are just acquired from the respective general-purpose speech recognition servers with neither a synthesized speech made nor speech recognition by using such synthesized speech executed. By those lists being compared with the words contained in the user dictionary data, in the list of words of which general-purpose speech recognition server the respective words contained in the user dictionary data are contained is rendered into data. In this case, there is only an alternative selection, namely, the respective words contained in the user dictionary data is contained in the list of words for recognition (in the affirmative) or not contained therein (in the negative), so that a parameter for recognition result integration summarizing the acquired results is the same as exemplified in FIG. 3 or FIG. 4. Accordingly, how to use such parameter upon speech recognition being actually performed results in the same as exemplified above.

Further, when not only the list of words for recognition, but also a language model denoting the facility with which such words are recognized are available, a weighted parameter for recognition result integration as shown in FIG. 6 may be prepared. For instance, when an N-gram language model which is a representative language model is put to use, such methods are feasible as a value of unigram being the facility with which a certain word is recognized or the maximum value of bigram or trigram being the facility with which such word is recognized.

Example 4

Figure 16:
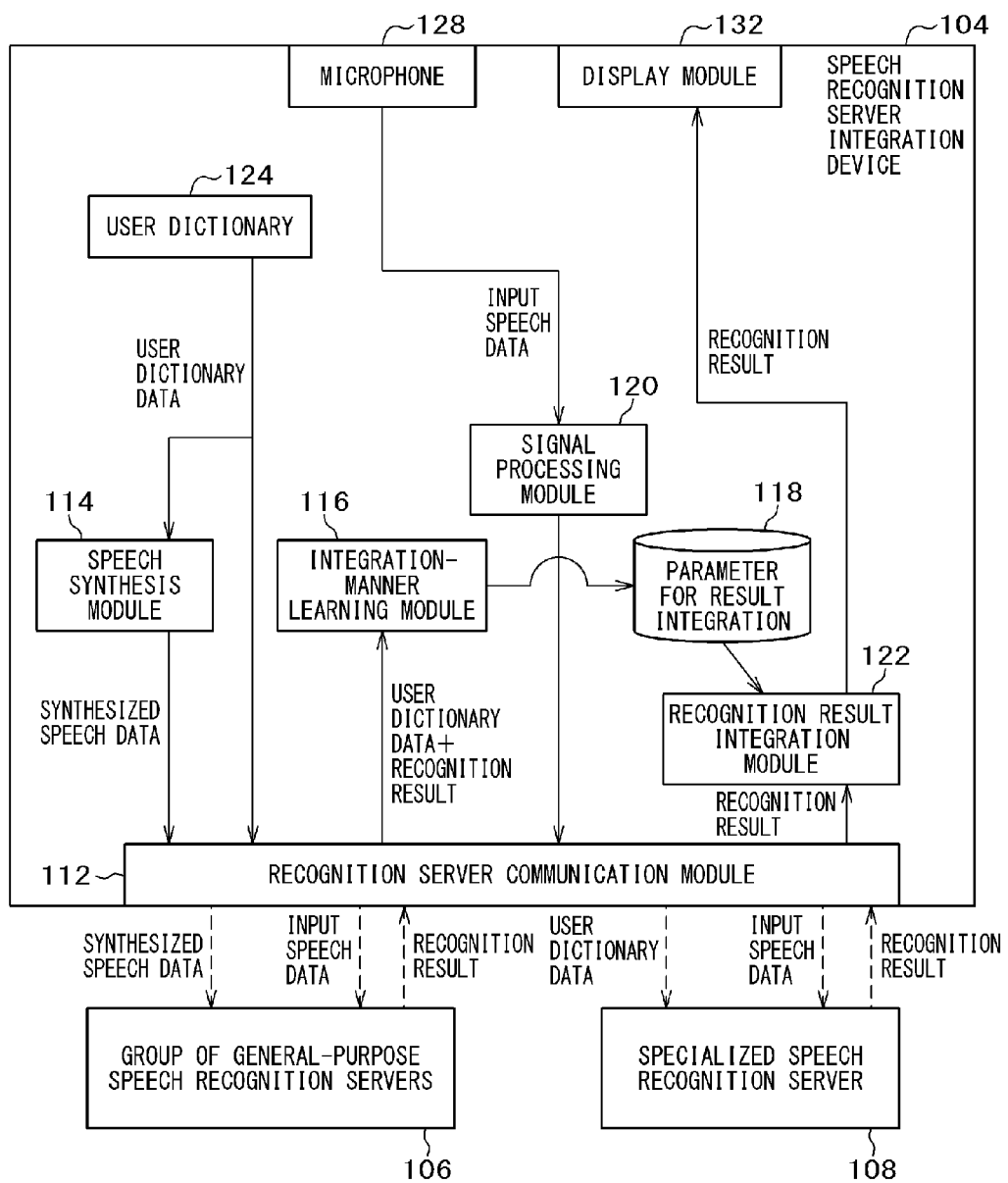
FIG. 16 illustrates the structural view of the speech recognition server device according to Example 4 of the present invention.

FIG. 16 is a view showing the arrangement of the speech recognition integration device in which input and output functions between a user and the device as well as speech recognition server integration function are integrally incorporated to realize the same functions as exemplified in FIG. 1. Here, the user dictionary data contained in the user dictionary 124 accumulated within the speech recognition server integration device 104 is transferred to the speech synthesis module 114 and the recognition server communication module 112. The voice spoken by a user is taken in through the microphone 128 and transferred to the signal processing module 120. The operational steps taken with those structural elements are the same as those explained and exemplified in FIG. 1 and the recognition result is defined at the recognition result integration module 122 in the end. Such recognition result is transferred to the display module 132 within the device so as to make it produced to a user.

Example 5

Figure 17:
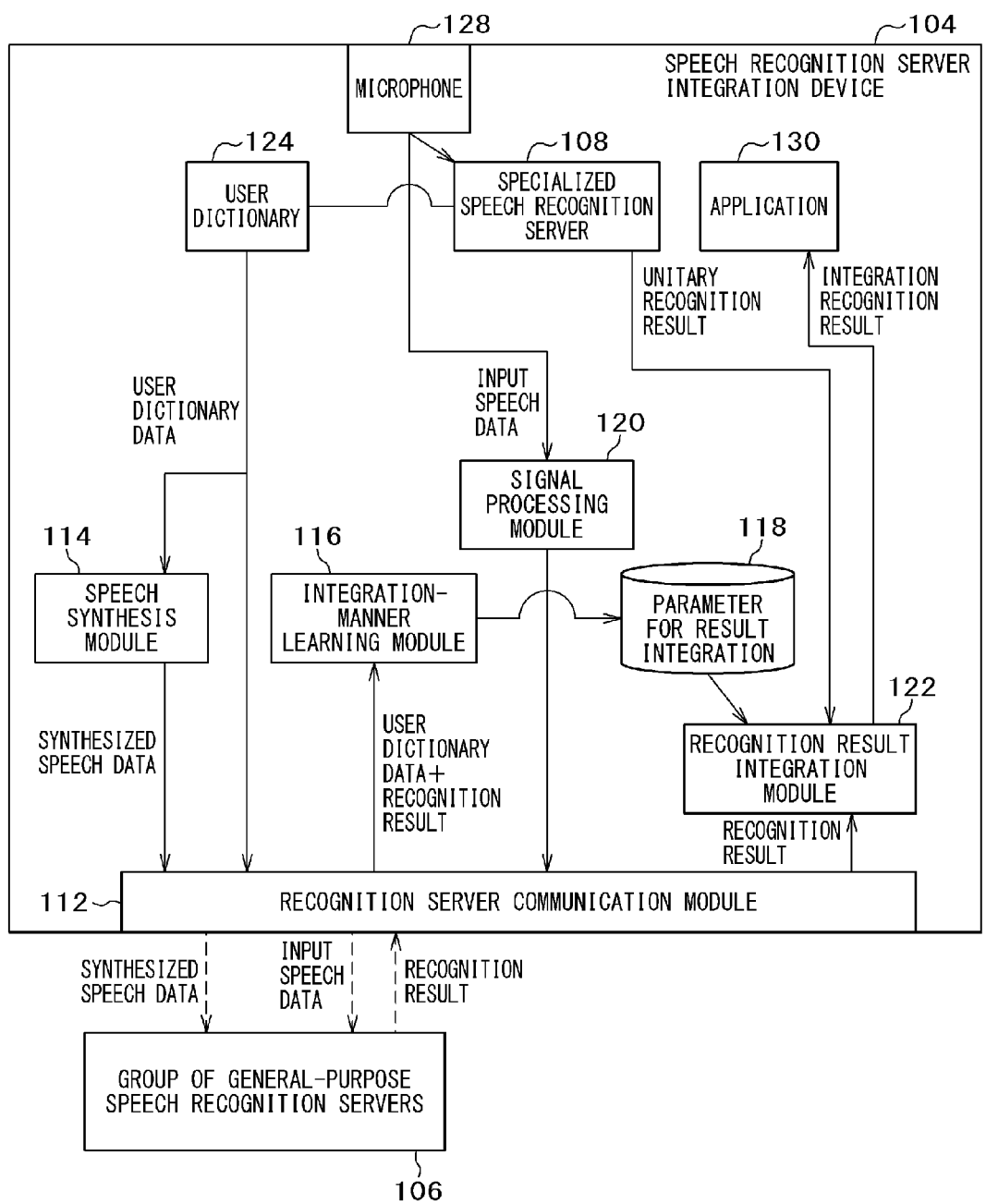
FIG. 17 illustrates the structural view of the speech recognition server device according to Example 5 of the present invention.

FIG. 17 is a view showing the arrangement of the speech recognition integration device in which the function in charge of the specialized speech recognition server is further incorporated based on the arrangement exemplified in FIG. 16. What the input speech is taken in from the microphone 128 incorporated in the speech recognition server integration device 104 and the user dictionary data contained in the user dictionary is transferred are the same as exemplified in FIG. 16, in addition to which in this example the specialized speech recognition module 108 is incorporated in the device and the specialized speech recognition module directly retrieves the content of the user dictionary so as to recognize speech data sent from the microphone. The acquired unitary recognition result is sent to the recognition result integration module 122 so as to be integrated with the recognition results through a group of general-purpose speech recognition servers 106. The integrated recognition results are sent to the application 130 within the device, where such results are exploited for each purposes of the application.

INDUSTRIAL APPLICABILITY

The speech recognition integration device according to the present invention, which intervenes between an in-vehicle terminal and speech recognition servers, is applicable to a speech data intermediate device to provide high-precision speech recognition function.

REFERENCE SIGNS LIST 102 user terminal
104 intermediate server
106 group of general-purpose speech recognition servers
108 specialized speech recognition server
110 terminal communication module
112 recognition server communication module
114 speech synthesis module
116 integration-manner learning module
118 parameter for recognition result integration
120 signal processing module
122 recognition result integration module
124 user dictionary
126 words comparison/similarity estimation module
128 microphone
130 application
132 display module

The invention claimed is:

1. A speech recognition server integration device, which is an intermediate module to relay between a terminal module by which a user performs operations by way of speech and a speech recognition server to recognize speech data and to feed back its recognition result, the speech recognition server integration device being configured to:
   learn and preserve a parameter for recognition result integration based on words registered by the user or a list of words frequently used by the user;
   receive speech data spoken by the user for speech recognition from the terminal module;
   transmit the received speech data to a general-purpose speech recognition server and a specialized speech recognition server;
   receive recognition results of the speech data through the general-purpose speech recognition server and the specialized speech recognition server;
   compare the recognition results through the general-purpose speech recognition server and the specialized speech recognition server with the preserved parameter for recognition result integration and to select an optimum recognition result;
   transmit the selected recognition result to the terminal module;
   receive the words registered by the user or the list of words frequently used by the user from the terminal module;
   make synthesized speech based on the received words;
   transmit the made synthesized speech to the general-purpose speech recognition server and the specialized speech recognition server; and
   receive the recognition results of the synthesized speech through the general-purpose speech recognition server and the specialized speech recognition server,
   wherein the speech recognition server integration device concurrently analyses the words from which the synthesized speech derives and the recognition results to learn and preserve the parameter for recognition result integration.

2. The speech recognition server integration device according to claim 1, wherein the speech recognition server integration device is further configured to:
   receive the words registered by the user or the list of words frequently used by the user from the terminal module;
   receive a list of words for recognition from the general-purpose speech recognition server; and
   compare the list of words for recognition with the list of words received from the terminal module and to estimate similarity between the lists,
   wherein the speech recognition server integration device preserves an estimation result as the parameter for recognition result integration.

3. The speech recognition server integration device according to claim 1,
wherein the specialized speech recognition server makes a list of words for recognition target based on the words registered by the user or the list of words frequently used by the user and is capable of recognizing words contained in the list of words for recognition target with high precision.

4. The speech recognition server integration device according to claim 1,
wherein the specialized speech recognition server is incorporated in the speech recognition server integration device or the terminal module as a specialized speech recognition module.

5. The speech recognition server integration device according to claim 1,
wherein the parameter for recognition result integration accumulates accuracies and errors of the recognition results of the words registered or frequently used by the user through the speech recognition servers,
wherein the speech recognition server integration device extracts the recognition results of a certain word through the speech recognition servers from the parameter for recognition result integration based on the recognition result through the specialized speech recognition server and extracts only the recognition results through the speech recognition servers whose recognition results are accurate to select an optimum recognition result based on the extracted recognition results.

6. The speech recognition server integration device according to claim 1,
wherein the parameter for recognition result integration accumulates accuracies and errors of the recognition results of the words registered and frequently used by the user through the speech recognition servers and values denoting confidence measures of the recognition results of the individual words through the speech recognition servers,
wherein the speech recognition server integration device extracts the recognition results and the confidence measures of the recognition results of a certain word through the speech recognition servers from the parameter for recognition result integration based on the recognition result through the specialized speech recognition server and extracts only the recognition results and the confidence measures of the recognition results through the speech recognition servers whose extracted recognition results are accurate to integrate the extracted recognition results by weighting with the confidence measure on the extracted recognition results.

7. The speech recognition server integration device according to claim 1,
wherein the parameter for recognition result integration measures time required for the speech recognition servers recognizing the words registered or frequently used by the user and accumulates the measured time values,
wherein the speech recognition server integration device extracts time required for the speech recognition servers recognizing a certain word from the parameter for recognition result integration based on the recognition result through the specialized speech recognition server and obtains an allowable upper value of the time required for the speech recognition servers recognizing a certain word, which value is determined depending on an application in use, and extracts only the recognition results through the speech recognition servers whose time required for recognizing a certain word goes below the allowable upper value to select an optimum recognition result based on the extracted recognition results.

8. The speech recognition server integration device according to claim 1,
wherein the parameter for recognition result integration accumulates accuracies and errors of the recognition results of the words registered or frequently used by the user and one misrecognition result or a plurality of misrecognition results through the speech recognition servers,
wherein the speech recognition server integration device extracts the accuracies and errors as well as misrecognition results of the recognition results of a certain word through the speech recognition servers from the parameter for recognition result integration based on the recognition result through the specialized speech recognition server and compares the extracted misrecognition result with a recognition result upon the recognition being executed when the extracted recognition result is an error and makes the recognition result effective only when it is determined that the comparison results are the same to select an optimum recognition result based on the recognition result made effective.

9. A speech recognition server integration method comprising:
a step of learning and preserving a parameter for recognition result integration based on words registered by a user or a list of words frequently used by the user;
a step to transmit data of a speech spoken by the user for speech recognition to a general-purpose speech recognition server and a specialized speech recognition server;
a step to receive recognition results of the speech data through the general-purpose speech recognition server and the specialized speech recognition server;
a step to compare the recognition result through the general-purpose speech recognition server and the recognition result through the specialized speech recognition server with the parameter for recognition result integration to select an optimum speech recognition result;
a step of making a synthesized speech based on the words registered or frequently used by the user;
a step of transmitting the made synthesized speech to the general-purpose speech recognition server and the specialized speech recognition server; and
a step of receiving the recognition results of the synthesized speech through the general-purpose speech recognition server and the specialized speech recognition server,
wherein in the step of learning and preserving the parameter for recognition result integration the words from which the synthesized speech derives and the recognition results are concurrently analyzed to make the parameter for recognition result integration learnt and preserved.

10. The speech recognition server integration method according to claim 9, further comprising:
a step of acquiring the words registered by the user or the list of words frequently used by the user;
a step of receiving a list of words for recognition from the general-purpose speech recognition servers; and a step of comparing the list of words for recognition with the words registered by the user or the list of words frequently used by the user and estimating similarity between them, wherein in the step of learning and preserving the parameter for recognition result integration the estimation result is preserved as the parameter for recognition result integration.

\* \* \* \* \*